(No Model.)

W. WILLIAMS.
HARROW.

No. 495,924. Patented Apr. 18, 1893.

WITNESSES:
O. F. Eagles.
L. Douville

INVENTOR
William Williams
BY John A. Wiedersheim
ATTORNEY.

UNITED STATES PATENT OFFICE.

WILLIAM WILLIAMS, OF PHILADELPHIA, PENNSYLVANIA, ASSIGNOR OF ONE-HALF TO HALL & GARRISON, OF SAME PLACE.

HARROW.

SPECIFICATION forming part of Letters Patent No. 495,924, dated April 18, 1893.

Application filed October 13, 1892. Serial No. 448,735. (No model.)

*To all whom it may concern:*

Be it known that I, WILLIAM WILLIAMS, a citizen of the United States, residing in the city and county of Philadelphia, State of Pennsylvania, have invented a new and useful Improvement in Harrows, which improvement is fully set forth in the following specification and accompanying drawings.

My invention consists of an improvement in harrows, embodying toothed rollers which are adapted to be rotated in reverse direction, as hereinafter described and thus reliably harrow the ground, the means for carrying said rollers being freely connected with the frame of the harrow to prevent strain thereon, and are adapted to be raised and lowered, as will be hereinafter set forth.

Figure 1:
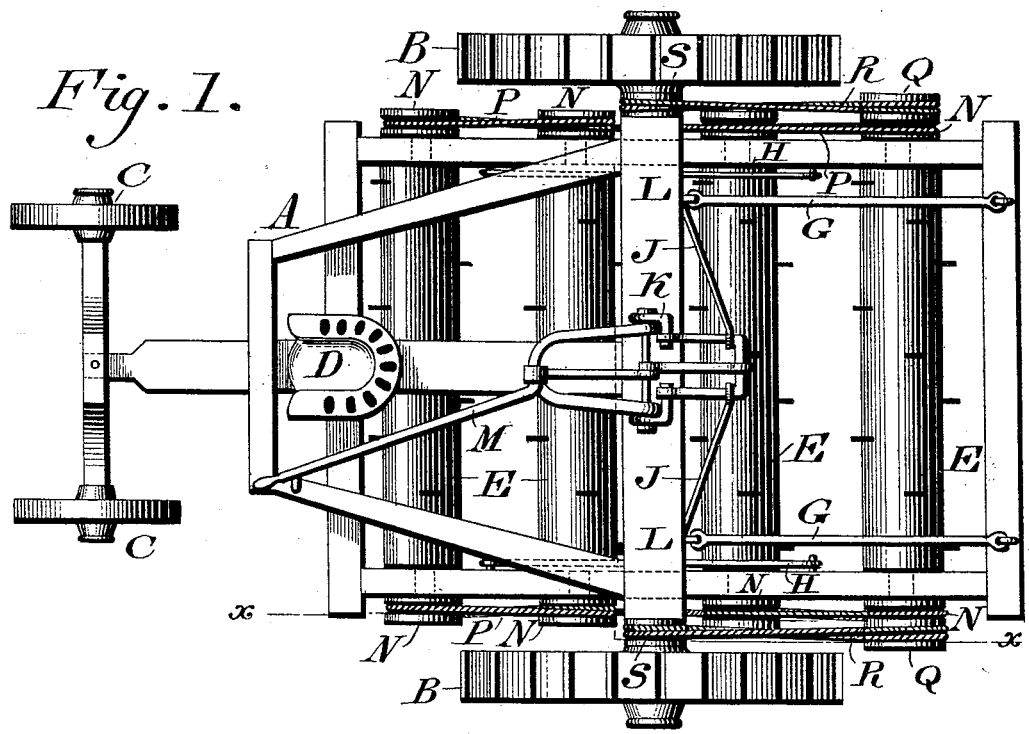
Figure 2:
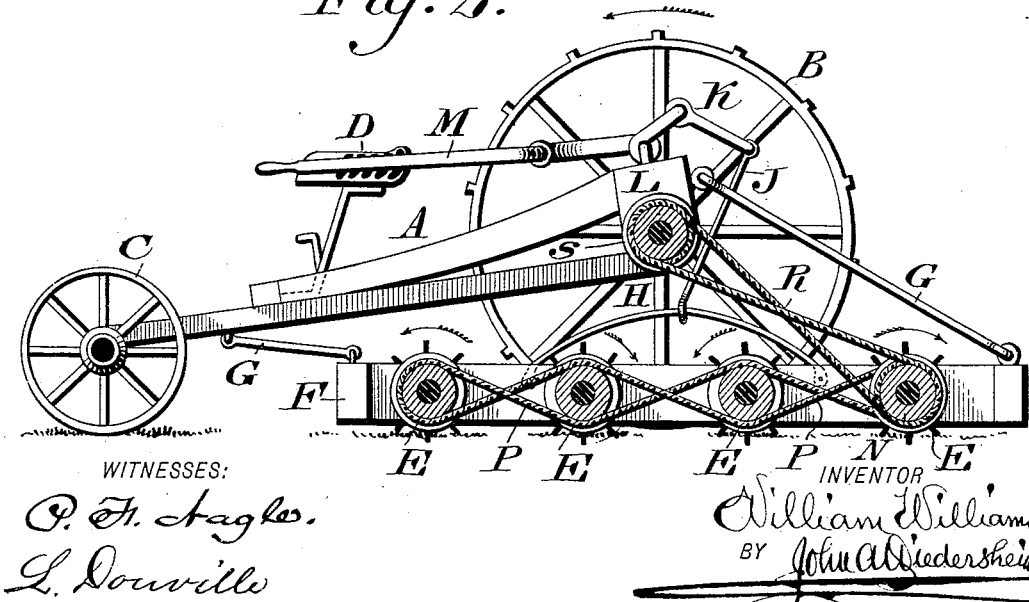

Figure 1 represents a top or plan view of a harrow embodying my invention. Fig. 2 represents a vertical section on line $x, x$, Fig. 1.

Similar letters of reference indicate corresponding parts in the two figures.

Referring to the drawings: A designates the frame of the harrow, which is mounted on the wheels B and C, and provided with a driver's seat D.

E designates a number of toothed rollers which extend parallel with the axis of the wheel B, and are mounted on the frame F, which depends from and is freely connected with the frame A by means of the hangers G, so that the rollers may run on the ground or be raised therefrom.

Connected with the frame F are loops H with which are freely connected the links J, the upper ends whereof are pivotally connected with the swinging arms K, whose bearings are on the axle of the cross piece L of the frame A. To the forward end of said arm K is secured a hanger or lever M, which is conveniently in reach from the driver's seat.

On the journals of the rollers E are pulleys N, around which pass cross belts P one of the rollers having also on its journals the pulleys Q, around which pass belts R which also pass around pulleys S on the hubs of the wheel B.

The operation is as follows, the parts being in the position shown in Fig. 2. As the harrow is drawn forward, and the wheels B, C, rotated, motion is communicated by the pulleys S, belts R, and pulleys Q to one of the rollers E, and thus to the several rollers, owing to the pulleys N and belts P, by which provision the members of each pair of rollers rotate in reverse direction, thus causing an effective harrowing of the ground, it being noticed that as the frame of the rollers E depends freely from the frame A, there is no strain on the latter, and said rollers may rise and fall, due to material inequalities of the ground. When the device is not required for operation, the lever M is lowered, whereby owing to the arm K, links J and loops H, the frame F is raised and the rollers E are lifted from the ground, the effect of which is evident.

Having thus described my invention, what I claim as new, and desire to secure by Letters Patent, is—

1. A harrow having a frame with the running wheels mounted thereon, a depending frame with toothed rollers suspended from first frame, means for raising and lowering said depending frame, and means connected with the axle of the running wheels and said rollers for rotating the adjacent rollers in opposite directions, said parts being combined substantially as described.

2. A harrow having a depending frame with toothed rollers journaled thereon, means for raising and lowering said frame, and means connected with the axle of the running gear of the harrow for rotating adjacent rollers in opposite direction at the same time, said parts being combined substantially as described.

3. The frame F carrying the harrow rollers E, a belt for rotating said rollers in reverse direction, a pulley on the driving wheel, and a belt passing around said pulley and a pulley on one of the rollers, said parts being combined substantially as described.

4. The frame F, the harrow rollers E mounted thereon and means for rotating said rollers in reverse direction, and means for imparting power to said rollers from the driving wheel of the harrow, in combination with the hangers G, which are freely connnected with the frame of the harrow and the carrying frame of the rollers, substantially as described.

WILLIAM WILLIAMS.

Witnesses:
JOHN A. WIEDERSHEIM,
R. H. GRAESER.